United States Patent [19]

De Wilde

[11] Patent Number: 4,465,923

[45] Date of Patent: Aug. 14, 1984

[54] APPARATUS FOR CONVERTING A LABORATORY AIR FURNACE TO A REDUCTION FURNACE

[75] Inventor: Mark A. De Wilde, Forest Hill, Md.

[73] Assignee: The United States of America as represented by the Secretary of the Army, Washington, D.C.

[21] Appl. No.: 460,104

[22] Filed: Jan. 24, 1983

[51] Int. Cl.[3] .............................. F27B 5/00; B01J 3/04

[52] U.S. Cl. ...................................... 219/390; 432/198

[58] Field of Search ................ 219/390; 373/110, 111; 432/198; 34/36, 37

[56] References Cited

U.S. PATENT DOCUMENTS

| | | | |
|---|---|---|---|
| 1,996,564 | 4/1935 | Blanchet | 432/198 |
| 2,787,457 | 4/1957 | Bogdan | 219/390 |
| 2,916,535 | 12/1959 | Marden | 219/390 |
| 3,109,911 | 11/1963 | Kremer | 219/390 |
| 4,185,397 | 1/1980 | Hutzenlaub | 34/36 |
| 4,375,027 | 2/1983 | Zeto et al. | 219/390 |

*Primary Examiner*—Roy N. Envall, Jr.
*Assistant Examiner*—Teresa J. Walberg
*Attorney, Agent, or Firm*—Anthony T. Lane; Robert P. Gibson; Michael C. Sachs

[57] ABSTRACT

A welded stainless steel box of rectangular cross section having a water cooled flange and cover is used in conjunction with an evacuation system and a pressure regulated and flow controlled gas supply to convert a standard air fired laboratory muffle furnace to a reducing gas furnace. A porous metal water-cooled plug is used to safely burn off the vented gas.

4 Claims, 2 Drawing Figures

APPARATUS FOR CONVERTING A LABORATORY AIR FURNACE TO A REDUCTION FURNACE

GOVERNMENTAL INTEREST

The invention described herein may be manufactured, used and licensed by or for the Government for governmental purposes without the payment to me of any royalty thereon.

BACKGROUND OF THE INVENTION

1. Field of the Invention

The present invention relates to a retrofit insert for use in a standard laboratory muffle furnace which allows heating of small objects to a temperature up to approximately 1000° C. in the presence of a reducing atmosphere.

2. Description of the Prior Art

Reduction furnaces presently commercially available are typically complex and relatively large in size and cost. Some models utilize the cracking of ammonia ($NH_3$) into nitrogen and hydrogen gases to attain the reducing atmosphere, but these usually have minimum operating temperatures in excess of 600° C. The cost and complexity of the aforementioned devices usually precludes their use in a laboratory where, for the amount of use projected, the cost would be unjustifiable.

The problem with prior art high temperature air furnaces, that were built for general laboratory use, is that they are not readily convertible for a reducing furnace application. These prior art laboratory air furnaces frequently contain muffles which are porous or have non-lock tight closures. This construction frequently results in the work processed being oxidized or permits the buildup of an explosive gas mixture in the muffle.

SUMMARY OF THE INVENTION

The present invention allows a laboratory air furnace to be used as a reduction furnace with a minimum expenditure for tooling, materials and labor. A flanged water cooled container is fitted on its open end with a removable matched water cooled cover.

The container is pneumatically coupled to a vacuum pump and to a pressure regulated and flow controlled gas supply source. The closed end of the container slidably fits into the open end of the air furnace. The present invention has no complex control system or mechanical seals that can fail during furnace operation. The standard laboratory furnace controls are used to heat the rectangularly shaped stainless steel insert and its contents to the desired temperature in a reducing atmosphere. A porous metal-water cooled plug is used to safely burn off escaping reducing gas from the container.

An object of the present invention is to provide a retrofit insert for a standard laboratory muffle furnace with minimum tooling cost.

Another object of the present invention is to provide a retrofit insert for a standard laboratory muffle furnace which does not require a complex electrical or gas handling system.

A further object of the present invention is to provide a retrofit insert for a standard laboratory furnace which eliminates the need for complex mechanical seals.

For a better understanding of the present invention, together with other and further objects thereof, reference is made to the following descriptions taken in connection with the accompanying drawings.

DESCRIPTION OF THE PREFERRED EMBODIMENTS

Figures 1, 2:
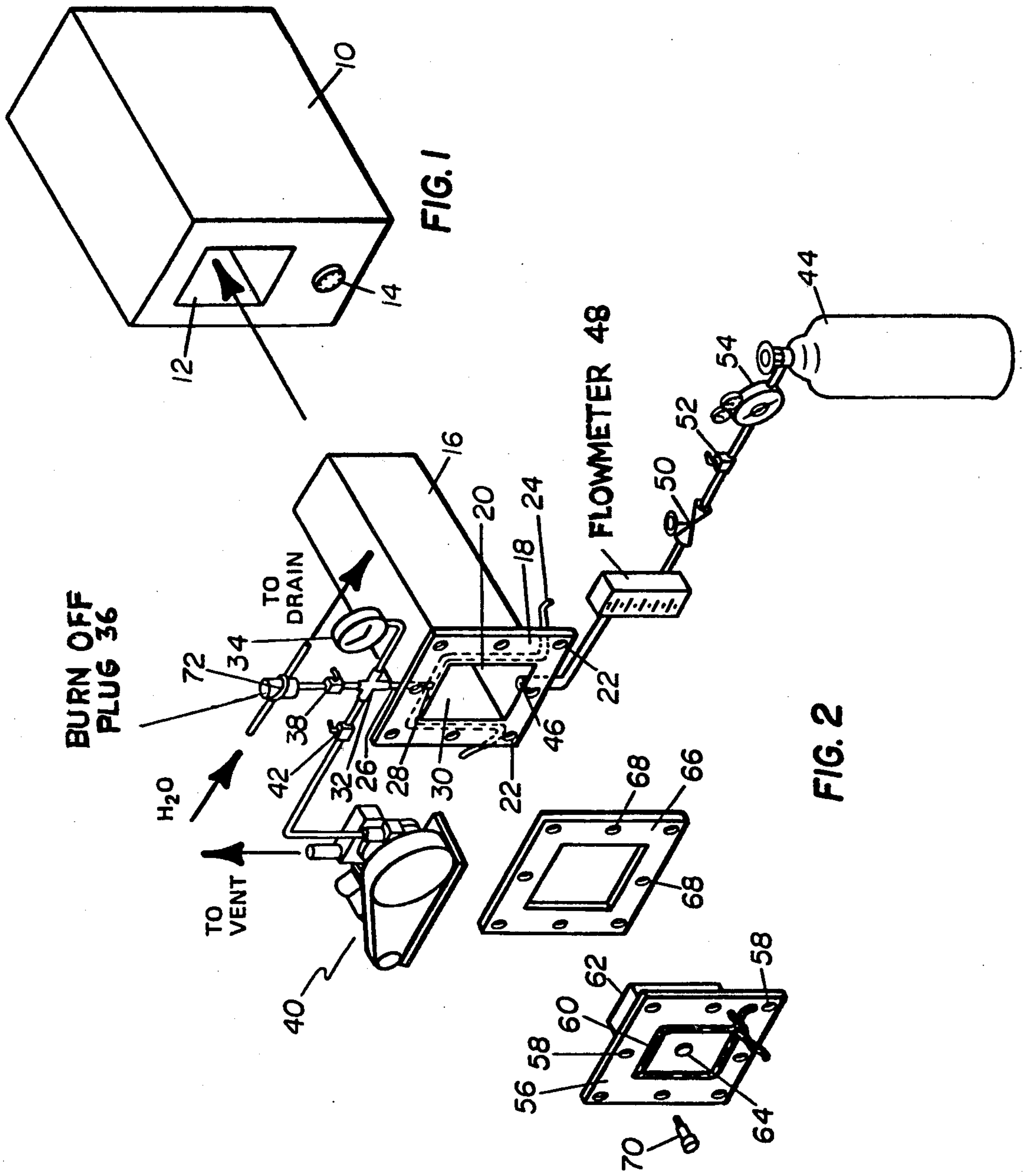
FIG. 1 is an isometric view of a standard laboratory furnace.
FIG. 2 is an exploded isometric view of retrofit insert connected to a gas source and a venting system.

Referring now to FIG. 1, a standard electric laboratory furnace 10 has a rectangularly shaped heating chamber 12 positioned therein and a heat control adjustment member 14 positioned in a front side.

Referring now to FIG. 2, a rectangularly shaped vacuum tight, welded stainless steel insert 16 is dimensioned to slidably fit into chamber 12. Insert 16 has a flange 18 welded to the open end 20 and a plurality of threaded peripherally disposed bolt holes 22 therethrough. A water cooling coil 24 is fixedly attached to the rear side of flange 18 and connected to a water supply not shown. A vent pipe 26 is pneumatically connected on one end to vent orifice 28 located in insert cavity 30 on the top wall of insert 16. The other end of vent pipe 26 is pneumatically coupled via cross type pipe connector 32 to a vacuum pressure gage 34, to a sintered metal vent gas burn plug 36 through a first vacuum tight valve 38, and to a vacuum pump 40 through a second vacuum tight valve 42. Reducing gas contained in supply tank 44 is pneumatically supplied to cavity 30 by means of supply orifice 46 through flowmeter 48 which is in series with a metering valve 50, a third vacuum tight cut-off valve 52, and through a pressure regulator 54. The front plate cover 56 has a plurality of cover bolt holes 58 which are in axial alignment with threaded flange holes 22. A second cooling water coil 60 is fixedly attached to the front side of cover 56 and connected to the water supply previously mentioned. A fire brick 62 is fixedly attached to the rear side of cover 56 by a screw 64 and is used to help retain the heat within the insert 16 by entering the open end. A rubber gasket 66, having a plurality of gasket bolt holes 68 axially aligned with holes 22 and 58, is positioned intermediate to flange 18 and cover 58. Gasket 66 provides a vacuum seal for insert 16 when a plurality of bolts 70 are used to screw cover 56 to flange 18.

In operation, after the insert 16 is slid into chamber 12 the water supply is connected to cooling coils 24 and 60 and water flow is established. The work to be fired is inserted in cavity 30 and the front plate cover 56 is bolted on with gasket 66 intermediate cover 56 and flange 18, thus making insert 16 vacuum tight. First and third valves 38 and 52 respectively, are closed and second valve 42 and metering valve 52 are opened.

The insert 16 is evacuated by vacuum pump 40 until gauge 34 indicates 1 mm Hg. pressure or less. At this point, the oxygen content in insert 16 has a maximum partial pressure of 0.2 mm Hg. The second valve 42 is then closed and the third valve 52 is opened to allow the reducing gas from tank 44 to enter the system through pressure regulator 54. Metering valve 50 is adjusted so that flowmeter 48 indicates 0.6 liters of gas per minute. When pressure gauge 34 reads 770 mm Hg, the first vacuum tight shut-off valve 38 is opened and the escaping reducing gas, such as hydrogen, at porous plug 36 is ignited and allowed to burn away harmlessly. Plug 36 is cooled by one or more turns of copper pipe 72 which is wrapped around its periphery. Danger of back-firing of the flammable reducing gas is eliminated by firstly evacuating all oxygen from the insert 16 and associated piping before admitting the reducing gas, and secondly by the fact that the porous plug 36 openings are smaller than the quenching distance of the reducing gas flame, so that it is impossible for the flame to propagate into the insert cavity 30. Furnace 10 is now set to the desired temperature by heat control member 14 and the work positioned in cavity 30 heated for the desired time. Shutting down the system is accomplished by reversing the order of the start up procedure aforedescribed.

While there has been described and illustrated specific embodiments of the invention, it will be obvious that various changes, modifications and additions can be made herein without departing from the field of the invention which should be limited only by the scope of the appended claims.

What is claimed is:

1. A reducing furnace comprising a laboratory air furnace having a heating chamber therein;

(i) rectangularly shaped, welded stainless steel, vacuum tight, container having an open end with a vent orifice disposed in a top wall thereof and a supply orifice disposed in a bottom wall;

(ii) a water cooled flange operatively disposed on said open end, said flange having a plurality of threaded bolt holes therein for bolts placed therethrough;

(iii) cover means removeably attached to said flange for allowing access to said muffle and for providing a vacuum tight cover therefor, which includes;

(iv) gasket means disposed intermediate said cover means and said flange for providing a compliant vacuum tight seal means between the front of said flange and the rear surface of said cover; a water cooled pipe fixedly attached to the front face of said cover means; and a fire brick fixedly attached to the rear side of said cover means for slidably entering the open end of said stainless steel container to retain heat therein;

(v) pumping means pneumatically connected to said insert means for evacuating residual air from said insert means, including a vacuum pump pneumatically connected to said vent orifice; and a second vacuum tight valve pneumatically connected intermediate said vacuum pump and said vent orifice;

(vi) gas supply means for providing a reducing atmosphere to said insert means; including a pressurized tank having hydrogen gas therein; and a pressure regulator pneumatically connected to said pressurized tank for maintaining a controlled reducing gas pressure in said insert means, means for measuring the pressure contained in said insert means, including a vacuum pressure gauge pneumatically coupled to said vent orifice, said gauge having a range which varies from at least 1 mm Hg to 770 mm Hg pressure;

(vii) means for controlling the flow of said reducing gas; including a flow meter pneumatically connected to said supply orifice of said insert means;

a metering valve pneumatically connected to the input side of said flow meter; and a third cutoff valve pneumatically connected intermediate said metering valve and said pressure regulator; and (viii) means for harmlessly burning off the excess reducing gas vented from said vent orifice of said insert means, including a first vacuum tight shut-off valve pneumatically coupled to said vent orifice;

a porous metal burn plug pneumatically connected to said first shut off valve for allowing said reducing gas to burn away harmlessly; and (ix) a cooling coil peripherally disposed on said burn plug, whereby elements (i)-(ix) are adapted to be easily disassembled from said reducing furnace, for use of the furnace as an air furnace.

2. A reducing furnace comprising a laboratory air furnace having a heating chamber therein;

(i) a rectangularly shaped, welded stainless steel, vacuum tight, container having an open end with a vent orifice disposed in a top wall thereof and a supply orifice disposed in a bottom wall;

(ii) a water cooled flange operatively disposed on said open end, said flange having a plurality of threaded bolt holes therein for bolts placed therethrough;

(iii) cover means removeably attached to said flange for allowing access to said muffle and for providing a vacuum tight cover therefor, which includes;

(iv) gasket means disposed intermediate said cover means and said flange for providing a compliant vacuum tight seal means between the front of said flange and the rear surface of said cover; a water cooled pipe fixedly attached to the front face of said cover means; and a fire brick fixedly attached to the rear side of said cover means for slidably entering the open end of said stainless steel container to retain heat therein;

(v) pumping means pneumatically connected to said insert means for evacuating residual air from said insert means, including a vacuum pump pneumatically connected to said vent orifice; and a second vacuum tight valve pneumatically connected intermediate said vacuum pump and said vent orifice;

(vi) gas supply means for providing a reducing atmosphere to said insert means; including a pressurized tank having hydrogen gas therein; and a pressure regulator pneumatically connected to said pressurized tank for maintaining a controlled reducing gas pressure in said insert means, means for measuring the pressure contained in said insert means, including a vacuum pressure gauge pneumatically coupled to said vent orifice, said gauge having a range which varies from at least 1 mm Hg to 770 mm Hg pressure, (vii) means for controlling the flow of said reducing gas including;

a flow meter pneumatically connected to said supply orifice of said insert means;

a metering valve pneumatically connected to the input side of said flow meter; and a third cutoff valve pneumatically connected intermediate said metering valve and said pressure regulator, and (viii) means for harmlessly burning off the excess reducing gas vented from said vent orifice of said insert means, including a first vacuum tight shut-off valve pneumatically coupled to said vent orifice;

a porous metal burn plug pneumatically connected to said first shut off valve for allowing said reducing gas to burn away harmlessly; and (ix) a cooling coil peripherally disposed on said burn plug, and whereby said reducing furnace can be selectively converted to use as an air furnace without refitting, by deletion of elements (i)–(ix) which elements are adapted to be easily disassembled without refitting of said reducing furnace.

3. A laboratory air furnace apparatus including:

(i) a rectangularly shaped, welded stainless steel, vacuum tight, container having an open end with a vent orifice disposed in a top wall thereof and a supply orifice disposed in a bottom wall;

(ii) a water cooled flange operatively disposed on said open end, said flange having a plurality of threaded bolt holes therein for bolts placed therethrough;

(iii) cover means removeably attached to said flange for allowing access to said muffle and for providing a vacuum tight cover therefor, which includes;

(iv) gasket means disposed intermediate said cover means and said flange for providing a compliant vacuum tight seal means between the front of said flange and the rear surface of said cover; a water cooled pipe fixedly attached to the front face of said cover means; and a fire brick fixedly attached to the rear side of said cover means for slidably entering the open end of said stainless steel container to retain heat therein;

(v) pumping means pneumatically connected to said insert means for evacuating residual air from said insert means, including a vacuum pump pneumatically connected to said vent orifice; and a second vacuum tight valve pneumatically connected intermediate said vacuum pump and said vent orifice, (vi) gas supply means for providing a reducing atmosphere to said insert means; including a pressurized tank having hydrogen gas therein; and a pressure regulator pneumatically connected to said pressurized tank for maintaining a controlled reducing gas pressure in said insert means, means for measuring the pressure contained in said insert means, including a vacuum pressure gauge pneumatically coupled to said vent orifice, said gauge having a range which varies from at least 1 mm Hg to 770 mm Hg pressure, (vii) means for controlling the flow of said reducing gas; including a flow meter pneumatically connected to said supply orifice of said insert means;

a metering valve pneumatically connected to the input side of said flow meter; and a third cutoff valve pneumatically connected intermediate said metering valve and said pressure regulator; and (viii) means for harmlessly burning off the excess reducing gas vented from said vent orifice of said insert means, including a first vacuum tight shut-off valve pneumatically coupled to said vent orifice;

a porous metal burn plug pneumatically connected to said first shut off valve for allowing said reducing gas to burn away harmlessly; and (ix) a cooling coil peripherally disposed on said burn plug;

whereby said apparatus comprises a reducing furnace, and elements (i)–(ix) are adapted to be readily disassembled to restore said apparatus, without refitting as an air furnace.

4. A laboratory air furnace apparatus including:

(i) a rectangularly shaped, welded stainless steel, vacuum tight, container having an open end with a vent orifice disposed in a top wall thereof and a supply orifice disposed in a bottom wall;

(ii) a water cooled flange operatively disposed on said open end, said flange having a plurality of threaded bolt holes therein for bolts placed therethrough;

(iii) cover means removeably attached to said flange for allowing access to said muffle and for providing a vacuum tight cover therefor, which includes;

(iv) gasket means disposed intermediate said cover means and said flange for providing a compliant vacuum tight seal means between the front of said flange and the rear surface of said cover; a water cooled pipe fixedly attached to the front face of said cover means; and a fire brick fixedly attached to the rear side of said cover means for slidably entering the open end of said stainless steel container to retain heat therein;

(v) pumping means pneumatically connected to said insert means for evacuating residual air from said insert means, including a vaccum pump pneumatically connected to said vent orifice; and a second vacuum tight valve pneumatically connected intermediate said vacuum pump and said vent orifice, (vi) gas supply means for providing a reducing atmosphere to said insert means; including a pressurized tank having hydrogen gas therein; and a pressure regulator pneumatically connected to said pressurized tank for maintaining a controlled reducing gas pressure in said insert means, means for measuring the pressure contained in said insert means, including a vacuum pressure gauge pneumatically coupled to said vent orifice, said gauge having a range which varies from at least 1 mm Hg to 770 mm Hg pressure, (vii) means for controlling the flow of said reducing gas; including a flow meter pneumatically connected to said supply orifice of said insert means;

a metering valve pneumatically connected to the input side of said flow meter; and a third cutoff valve pneumatically connected intermediate said metering valve and said pressure regulator, and (viii) means for harmlessly burning off the excess reducing gas vented from said vent orifice of said insert means, including a first vacuum tight shut-off valve pneumatically coupled to said vent orifice;

a porous metal burn plug pneumatically connected to said first shut off valve for allowing said reducing gas to burn away harmlessly; and (ix) a cooling coil peripherally disposed on said burn plug, whereby said apparatus including said elements (i)–(ix) comprises a reducing furnace, and said elements (i)–(ix) are adapted to be easily disassemblable to restore said apparatus without refitting, as an air furnace.

* * * * *